(12) United States Patent
Skayman

(10) Patent No.: US 12,714,028 B2
(45) Date of Patent: Aug. 25, 2026

(54) CONCAVE FOR A TWIN ROTOR COMBINE HARVESTER

(71) Applicant: Bushel Plus Ltd., Brandon (CA)

(72) Inventor: Murray Skayman, Hamiota (CA)

(73) Assignee: Bushel Plus Ltd., Brandon (CA)

( * ) Notice: Subject to any disclaimer, the term of this patent is extended or adjusted under 35 U.S.C. 154(b) by 264 days.

(21) Appl. No.: 18/584,673

(22) Filed: Feb. 22, 2024

(65) Prior Publication Data

US 2025/0268145 A1 Aug. 28, 2025

(51) Int. Cl.

*A01F 12/26* (2006.01)
*A01F 7/06* (2006.01)
*A01F 12/18* (2006.01)

(52) U.S. Cl.

CPC ................ *A01F 12/26* (2013.01); *A01F 7/06* (2013.01); *A01F 12/185* (2013.01)

(58) Field of Classification Search

CPC ......... A01F 12/26; A01F 12/185; A01F 76/06
See application file for complete search history.

(56) References Cited

U.S. PATENT DOCUMENTS 3,957,058 A 5/1976 Komancheck
4,249,543 A 2/1981 Rowland-Hill
4,711,075 A * 12/1987 Strong .................... A01F 12/24 460/120
4,711,252 A 12/1987 Bernhardt
4,739,773 A 4/1988 West
4,774,968 A * 10/1988 Spanlang ................ A01F 12/24 460/109
5,057,056 A * 10/1991 Kambeitz ............... A01F 12/24 460/110
6,358,142 B1 3/2002 Imel
9,504,204 B2 11/2016 Kile
10,412,896 B2 9/2019 Ohms et al.
2023/0041302 A1* 2/2023 Nohrden ................. A01F 7/067
2024/0172595 A1* 5/2024 Dahl ....................... A01F 12/26

FOREIGN PATENT DOCUMENTS

WO WO2025111716 6/2025

* cited by examiner

*Primary Examiner* — Russell Frejd
(74) *Attorney, Agent, or Firm* — Thomas J. Oppold; Larkin Hoffman Daly & Lindgren, Ltd.

(57) ABSTRACT

A concave apparatus is provided for use in a twin rotor combine harvester which includes replaceable concave inserts which are carried in a concave support frame including two side rails which extend around a portion of each rotor from a bottom of the rotor outwardly around approximately 90 degrees. The frame includes transverse connecting bars at right angles to the side rails with an upper bar, a center bar and a lower bar defining between them openings for the concave inserts. An upper transverse bar of the lower concave insert has fastener holes to receive coupling fasteners for connection to the center transverse bar of the concave support frame and has a projecting portion lying in an axial plane and projecting radially outwardly to a position beyond the center transverse bar of the concave frame with fastener holes therethrough for attachment to pivotal bracket of the combine harvester.

23 Claims, 8 Drawing Sheets

10
12
22
17
20
25
23
15
18
2
2
16
14
13

51
511

52
523
502
50
301
501
51
50
301
44
444
521
52
522
523

51
511
32
52
523
50

511
50
444
44
444
521
3
51
52
522
523

CONCAVE FOR A TWIN ROTOR COMBINE HARVESTER

BACKGROUND OF THE INVENTION

This invention relates to a concave apparatus for mounting on a combine harvester at one rotor of a twin rotor arrangement.

This invention relates to a combine harvester in which an axial flow rotary separator receives threshed material from a threshing cylinder and concave extending transversely with respect to the separator.

Combine harvesters using a rotary separator consisting of two side-by-side separator units receive threshed material from a cylinder and concave upstream of the separator are well known. This configuration is attractive and has become important in recently released new combine harvesters by important manufacturers including John Deere and CASE IH.

It combines the predictable and well understood crop performance of the conventional threshing cylinder and concave and the space-saving potential of the rotary separator.

Each of the two cylindrical rotors of the twin rotor arrangements includes a concave arrangement including a series of arcuate concave elements side by side, each extending around a portion of the cylinder which can be in an angle of the range 90 to 120 degrees. The side by side concave element are arranged at positions along the axis of the rotor so as to make up a portion of the length of the rotor.

The arrangement herein thus provides apparatus for mounting concaves in a combine having the pair of threshing and separating rotors extending in a longitudinal direction wherein the concaves can be mounted on its adjustable mounting frame through the side of the combine. A plurality of longitudinal spaced concave frame members are provided with yokes engageable with longitudinally extending mounting pins affixed to the mounting frame. Retaining links mounted on the mounting pins in conjunction with the concave yokes are connected to the concave frame members to retain the concave on the mounting pins during operation of the combine.

SUMMARY OF THE INVENTION

It is an object of the present invention to provide a concave arrangement for a dual rotor combine harvester which allows replacement of individual concave inserts while a concave frame remains in place. The arrangement herein is particularly designed and constructed for use with a John Deere X9 combine harvester. This arrangement allows the concaves to be changed for different crops or replaced when worn without the difficulty of removing the whole concave assembly.

According to a first aspect of the invention there is provided a concave apparatus for use in a combine harvester where the combine harvester includes:

- first and second side by side threshing and separating rotors;
- each rotor having associated therewith mounting arrangements for mounting a series of arcuate side by side concave elements, where each concave element extends angularly around a portion of the cylinder and where the side by side concave element are arranged at positions along the axis of the rotor;
- the mounting arrangement including an upper support for receiving an upper end of a respective concave element and a lower support for receiving a lower end of the respective concave element;

the concave apparatus comprising:

- a concave support frame including two side rails arranged to lie in respective radial planes of the axis and extend around the portion of the cylinder and a plurality of transverse connecting bars at right angles to the side rails;
- a pair of concave inserts each for insertion into and mounting on the concave support frame;
- each concave insert having a rectangular arcuate body with a plurality of rub bars facing the rotor for cooperation therewith;
- the transverse connecting bars of the concave support frame including an upper bar, a center bar and a lower bar defining an upper rectangular space for an upper one of the pair of concave inserts and a lower rectangular space for a lower one of the pair of concave inserts;
- the upper concave insert having a lower transverse bar at a lower end and an upper transverse bar at an upper end;
- with the upper transverse bar of the upper concave insert having fastener holes to receive coupling fasteners for connection to the upper transverse bar of the concave support frame;
- with the lower transverse bar of the upper concave insert having fastener holes to receive coupling fasteners for connection to the center transverse bar of the concave support frame;
- the lower concave insert having a lower transverse bar at a lower end and an upper transverse bar at an upper end;
- with the upper transverse bar of the lower concave insert having fastener holes to receive coupling fasteners for connection to the center transverse bar of the concave support frame;
- with the lower transverse bar of the lower concave insert having fastener holes to receive coupling fasteners for connection to the lower transverse bar of the concave support frame;
- at least one of the lower transverse bar of the upper concave insert and the upper transverse bar of the lower concave insert having a projecting portion lying in an axial plane of the axis and projecting in a direction radially outwardly from the axis to a position beyond the center transverse bar of the concave frame;
- the projecting portion having a plurality of fastener holes therethrough.

Preferably the upper transverse bar of the lower concave insert has the projecting portion thereon.

Preferably the upper and lower concave inserts are symmetrical for use in either the upper space or the lower space. Thus the upper insert also has the projecting portion which is not used in the mounting but allows the same component to be used in either location for simplicity or for replacement when worn.

Preferably each of the concave inserts includes side rails each of which lies immediately adjacent a respective side rail of the concave support rail.

Preferably the side rails of the concave insert are narrower than the concave support rails and the transverse bars of the concave support frame have a depth substantially equal to the side rails of the concave insert. Thus the projecting portion extends beyond the side rails of the concave insert.

Preferably the transverse connecting bars of the concave support frame including a top bar above the upper bar for attachment to the upper support of the mounting arrangement and wherein the concave support frame includes a lower engagement portion for engaging the lower support of the mounting arrangement.

Preferably the lower support of the mounting arrangement comprises a cylindrical rod extending parallel to the axis and the lower engagement portion comprises on each side rail a respective cup shaped receptacle for receiving the rod.

Preferably the upper support of the mounting arrangement comprises a V-shaped channel extending parallel to the axis and wherein the top bar of the concave support frame is arch shaped to engage into the V-shaped channel.

Preferably the concave support frame includes a concave portion between the upper bar and the top bar which has rub bars for cooperation with the rotor and the concave support frame includes a concave portion between the lower bar and the lower engagement portion which has rub bars for cooperation with the rotor.

According to a second aspect of the invention there is provided a combine harvester comprising:

first and second side by side threshing and separating cylindrical rotors each rotatable about a respective axis of the rotor;

a concave apparatus comprising a series of arcuate side by side concave elements each rotor having associated therewith mounting arrangements for mounting the side by side concave elements;

where each concave element extends angularly around a portion of the cylindrical rotor;

where the side by side concave element are arranged at positions along the axis of the rotor;

the mounting arrangement including an upper support for receiving an upper end of a respective concave element and a lower support for receiving a lower end of the respective concave element;

the mounting arrangement including for each respective concave element a bracket pivotally mounted at the lower support about an axis parallel to the axis and having a connecting bar movable between a first position at the concave element and a second release position spaced from the concave element;

each concave element comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

at least one of the lower transverse bar of the upper concave insert and the upper transverse bar of the lower concave insert having a projecting portion lying in an axial plane of the axis and projecting in a direction radially outwardly from the axis to a position beyond the center transverse bar of the concave frame;

the projecting portion having a plurality of fastener holes therethrough for fastening to the connecting bar when in the first position at the concave element;

the second release portion of the bracket being arranged such that the connecting bar is spaced from the concave element to allow release of the concave insert from the concave support frame while the concave support frame remains in place attached to the upper and lower supports.

Preferably the bracket includes two side rails connected to and supporting the connecting bar where the side rails of the bracket lie immediately adjacent the side rails of the concave support frame.

Preferably the lower support of the mounting arrangement comprises a cylindrical rod extending parallel to the axis and the side rails of the bracket pivot around the cylindrical rod.

According to a third aspect of the invention there is provided a combine harvester comprising:

first and second side by side threshing and separating cylindrical rotors each rotatable about a respective axis of the rotor;

a concave apparatus comprising a series of arcuate side by side concave elements each rotor having associated therewith mounting arrangements for mounting the side by side concave elements;

where each concave element extends angularly around a portion of the cylindrical rotor;

where the side by side concave element are arranged at positions along the axis of the rotor;

the mounting arrangement including an upper support for receiving an upper end of a respective concave element and a lower support for receiving a lower end of the respective concave element;

the mounting arrangement including for each respective concave element a bracket pivotally mounted at the lower support about an axis parallel to the axis and having a bracket connecting bar movable between a first position at the concave element and a second release position spaced from the concave element;

each concave element comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

the bracket connecting bar being connected to the respective concave element when in the first position at the concave element;

the bracket connecting bar being releasable from the respective concave element to move to the second release position of the bracket such that the bracket connecting bar is spaced from the concave element to allow release of the concave insert from the concave support frame while the concave support frame remains in place attached to the upper and lower supports.

BRIEF DESCRIPTION OF THE DRAWINGS

One embodiment of the invention will now be described in conjunction with the accompanying drawings in which.

DETAILED DESCRIPTION

Figure 1:
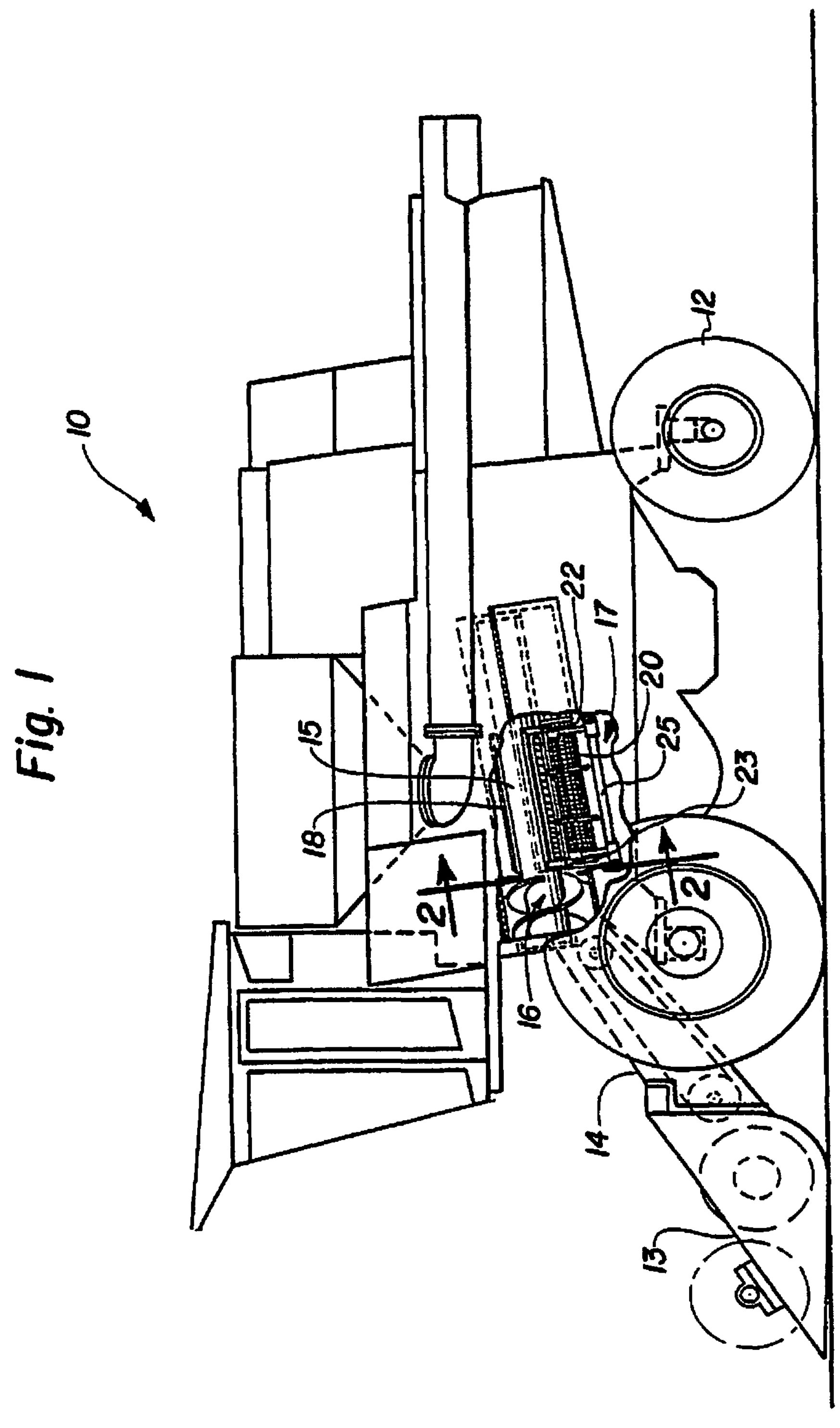
FIG. 1 is a left side elevational view of a PRIOR ART combine harvester to illustrate the components of the combine harvester with which the present invention cooperates, a portion of the side sheet of the combine being broken away to more clearly show the relative positions of the threshing and separating rotors and cooperatively mounted concave.

Referring now to the drawings and, particularly, to FIG. 1, a left side elevational view of a crop harvesting machine can be seen. The combine 10 is mounted on a wheeled frame 12 to move the combine 10 over the ground G for the harvesting of crops therefrom. A header 13 is mounted on the forward periphery of the combine 10 to engage and gather crop material from the ground and consolidate it into a feederhouse 14. The feederhouse 14 conveys a flow of crop material into the infeed area 16 of the threshing and separating rotor 15. The flow of crop material then passes into the threshing area 17 between the rotor 15 and the circumferentially mounted concave 20 where grain is threshed and separated from the crop material by rasp bar assemblies 18 cooperating with the concave 20.

Figure 2:
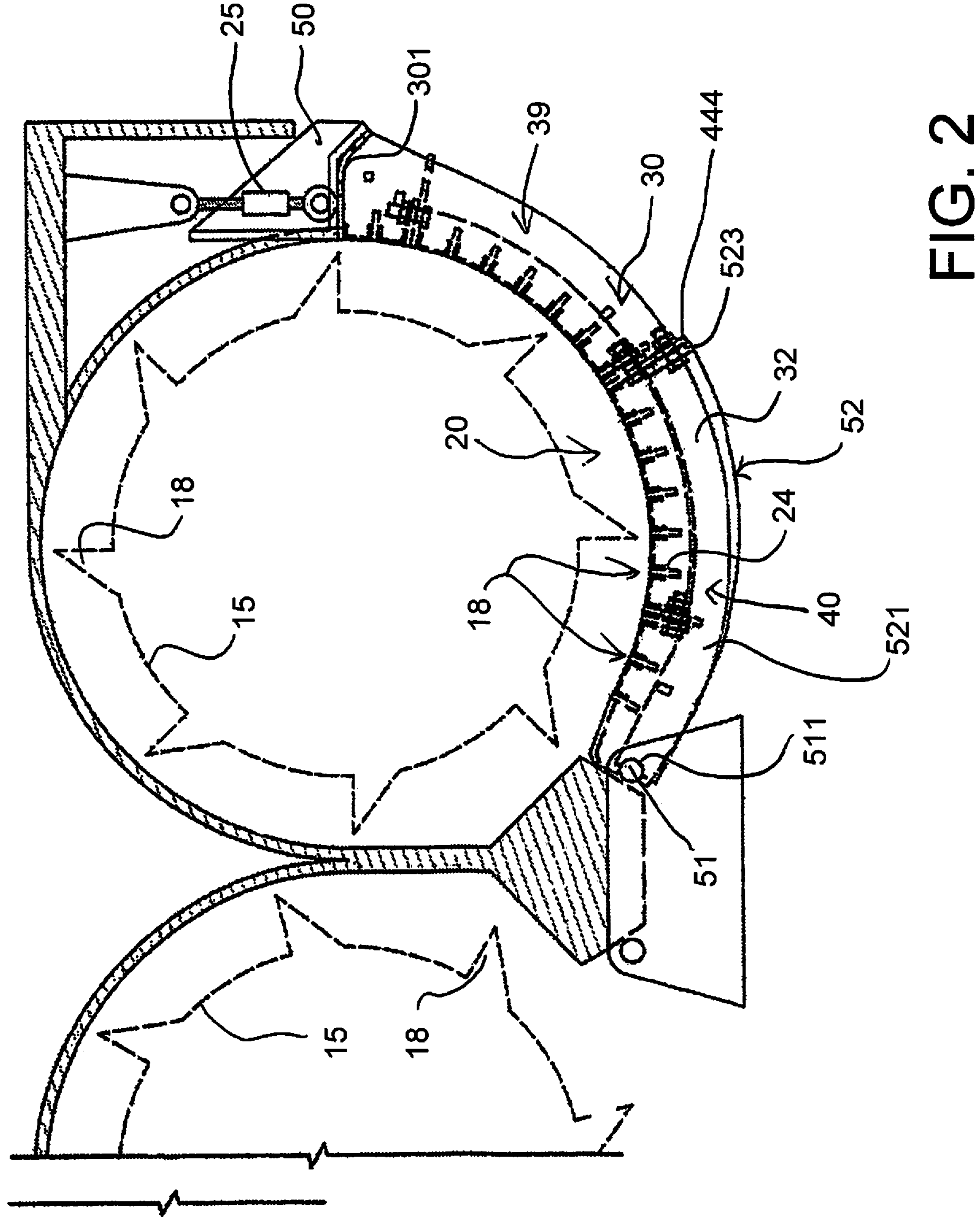
FIG. 2 is an enlarged partial cross-sectional view taken along lines 2-2 of the PRIOR ART combine harvester of FIG. 1, looking along the longitudinally extending axis of the threshing and separating rotor, the portions of the infeed structure in front of the left hand rotor being broken away to more clearly show the structure and relationships utilized in the side mount concaves forming the instant invention.

Referring now to FIG. 2, the relationship of the rotor 15 and the rasp bar assemblies 18 mounted thereon with respect to the concave 20 can best be seen. The concave 20 is provided with at least two longitudinally spaced side rails 22, the forwardmost of which is designated by the reference numeral 23, which carry a plurality of longitudinally extending rub bars 24 radially positioned relative to the rotor 15. Crop material entering between the rotor 15 and the concave 20 is rubbed between the rasp bar assemblies 18 and the rub bars 24 to separate the grain from the crop material. The concave 20 is mounted on an adjustable mounting frame 25 to permit movement of the concave 20 relative to the rotor 15.

In the remaining FIGS. 3 to 10 is shown a concave apparatus for use in a combine harvester of the type shown in FIGS. 1 and 2.

In this arrangement, the concave apparatus is arranged to extend from a position adjacent the bottom of the rotor over an angle of around 90 to 120 degrees to a position outwardly of the rotor. Thus each concave apparatus is only accessible from the respective outer side of the each of the rotors.

The concave apparatus includes a plurality of the components shown in the figures which are arranged side by side along the rotor to cover a portion only of the length of the rotor as shown in FIG. 1. The individual concave components can thus be removed from the mounting arrangement which holds them in place in the combine as describer hereinafter. The number and width of the concave components can vary to make up together the required length. The components can be removed and replaced to change the rub bar effect for different crops and for replacement when worn.

Figure 3:
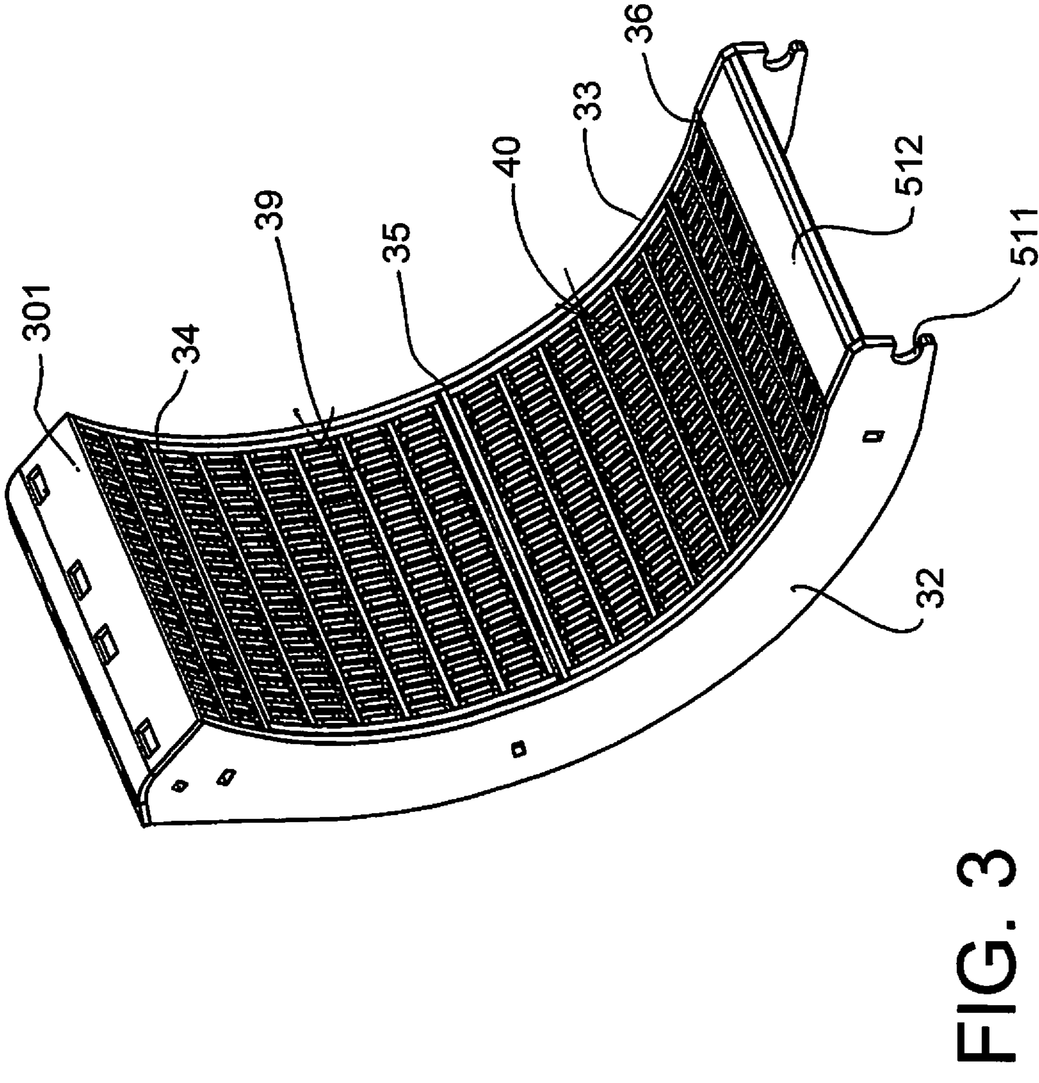
FIG. 3 is an isometric view of the inside face and one side of the concave apparatus according to the invention for mounting in the combine harvester of FIGS. 1 and 2.
Figure 4:
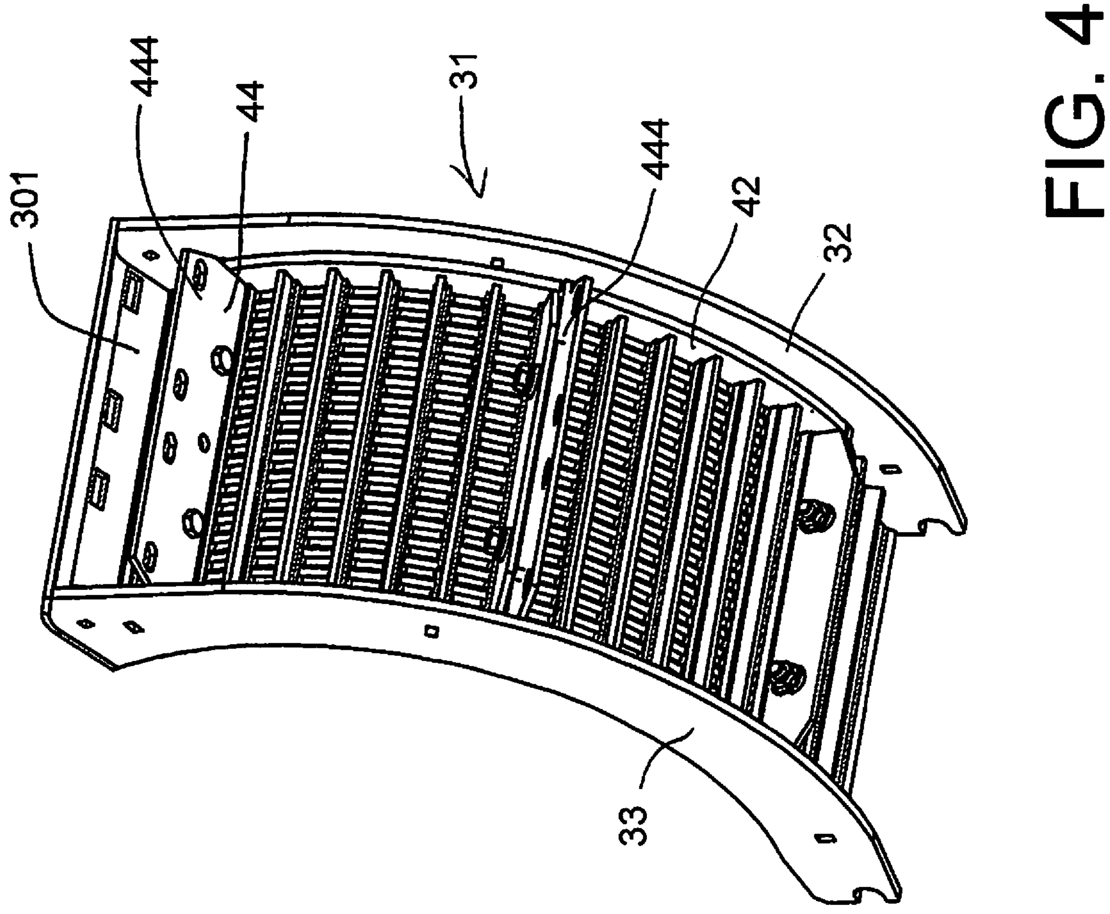
FIG. 4 is an isometric view of the outside face and one side of the concave apparatus of FIG. 3 according to the invention for mounting in the combine harvester of FIGS. 1 and 2.
Figure 9:
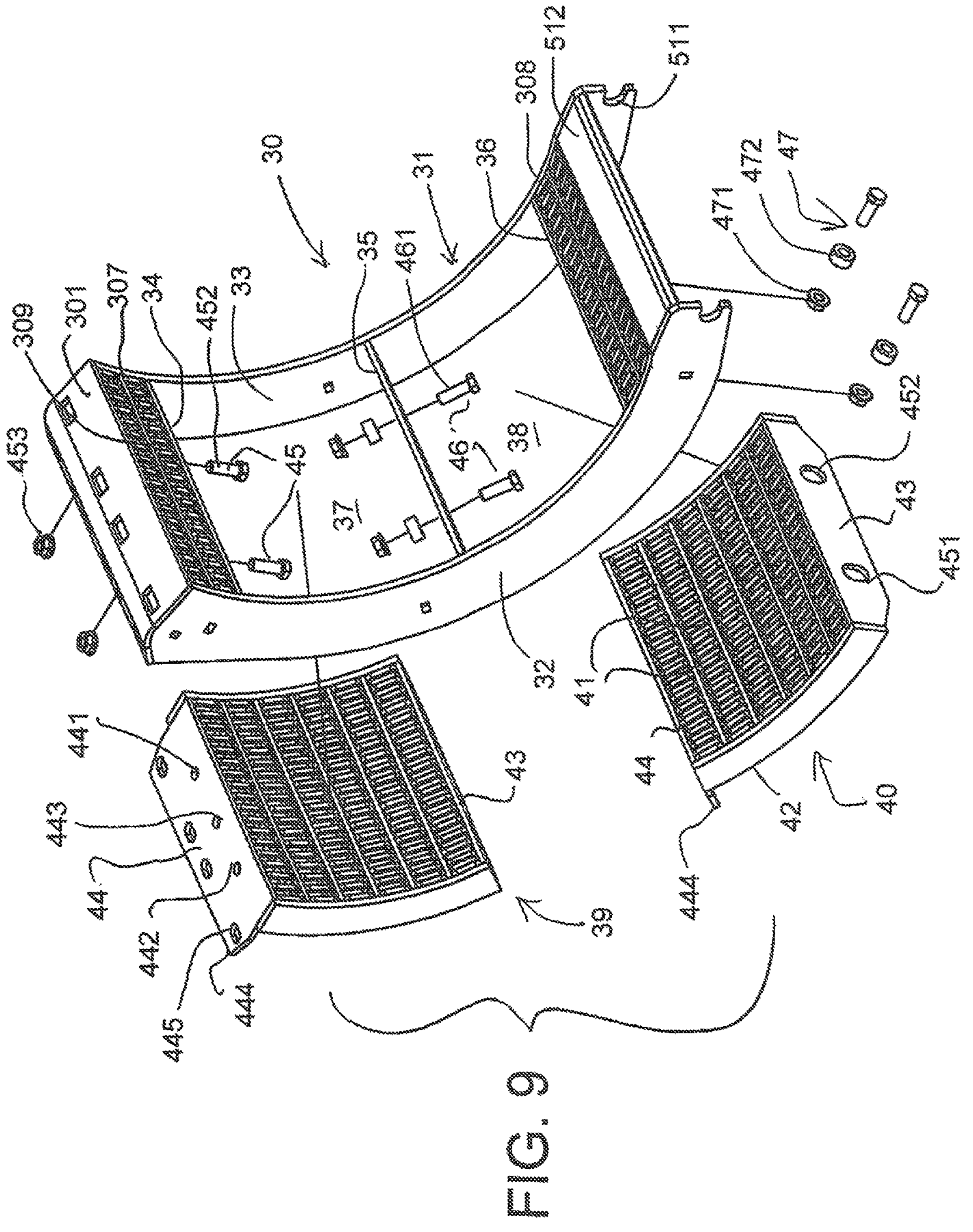
FIG. 9 is an exploded view of the components shown in the position of FIG. 3.

As shown in FIGS. 3 and 9, the concave apparatus 30 includes a concave support frame 31 including two arcuate side rails 32 and 33 arranged to lie in respective radial planes of the axis of the rotor and extend around the portion of the rotor as required. The frame 31 further includes a plurality of transverse connecting bars at right angles to the side rails 32 and 33. These include an upper bar 34, a center bar 35 and a lower bar 36 spaced to define an upper rectangular space 37 for an upper one of a pair of concave inserts 38 and a lower rectangular space for a lower one of the pair of concave inserts;

The concave inserts shown at 39 and 40 comprise a pair of the inserts each for insertion into and mounting on the concave support frame 31 at the spaces 37 and 38.

The pair of inserts have the same construction so that they are symmetrical and thus each can be mounted in each of the spaces. In this way they can be supplied as a common part reducing inventory and also can be replaced one for the other if wear occurs. Each concave insert 39, 40 has a rectangular arcuate body with a pair of side rails 42 and plurality of rub transverse bars 41 facing the rotor for cooperation therewith. Each concave insert has a width matching that of the space defined by the rails 32 and 33 so that the side rails 42 slide just inside the side rails 42 to fit therein without movement. The concave inserts each include a lower transverse bar 43 at a lower end and an upper transverse bar 44 at an upper end with the space between the bars 43 and 44 being arranged to fit in the space between the upper bar 34 and the center bar 35 or the space between the center bar 35 and the lower bar 36 of the concave frame.

The upper transverse bar 44 of the concave inserts has fastener holes 441 and 442 to receive coupling fasteners 45 for connection to the upper transverse bar 34 of the concave support frame 31. The lower transverse bar of the concave inserts has fastener holes 451 and 452 to receive coupling fasteners 46 for connection to the center transverse bar 35 of the concave support frame 31. Symmetrically, the lower concave insert has in the upper transverse bar fastener holes 441 and 442 to receive coupling fasteners for connection to the center transverse bar 35 of the concave support frame and in the lower transverse bar of the lower concave insert fastener holes 451 and 452 to receive coupling fasteners 47 for connection to the lower transverse bar 36 of the concave support frame 31.

It will be noted that the holes 441 and 442 are smaller than the holes 451 and 452. This is because the holes 441 and 442 directly receive a threaded fastener 452 of the fastener 45 as a sliding fit therein with nuts 453 connected on the upper face of the upper bar 34 of the frame to hold the upper end of the insert in lace. Symmetrically the lower insert has the smaller holes in the lower bar so as to receive the threaded section 461 of the fastener 46. The holes 451 and 452 are larger because they fit over the nut 471 and over a collar 472 of the fastener 47. In this way each of the inserts is simply a sliding fit over the nut at its bottom bar and is screw fastened at the top bar. In this way the inserts are held in place by screw connectors only at the top and can be loosely coupled at the bottom so that when the upper screw fasteners are removed the insert can simply be pulled out from its place by pulling the bottom holes 451 and 452 off the collar 472. A center hole 443 is provided between the holes 441 and 442 to receive an alignment punch prior to insertion of the fasteners 45 and 46 through the aligned holes in the bars to be coupled.

Figure 10:
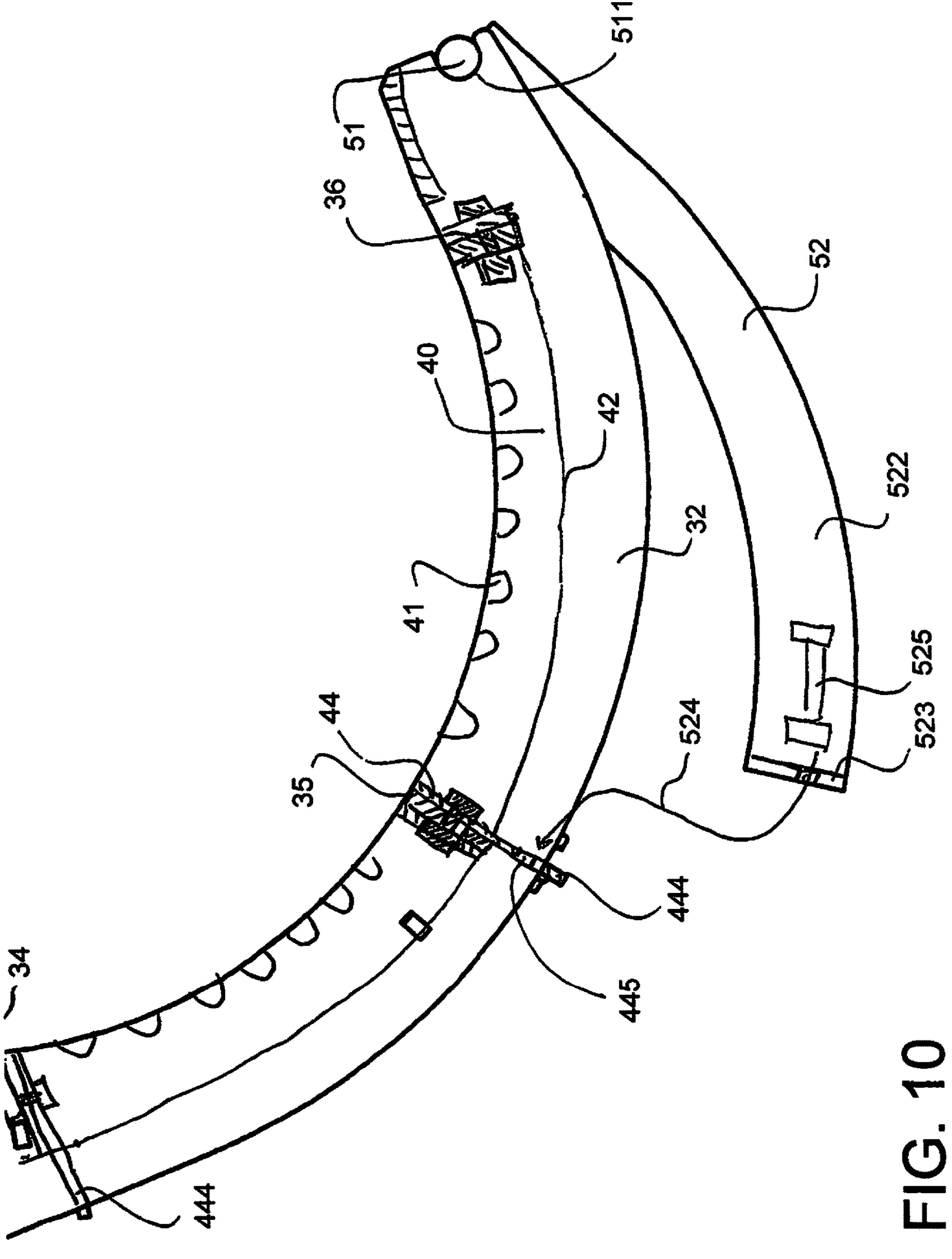
FIG. 10 is a cross-sectional view on an enlarged scale showing the cooperation between the bracket and the concave inserts.

The upper transverse bar 44 of the lower concave insert has a projecting portion 444 lying in an axial plane of the axis of the rotor and projecting in a direction radially outwardly from the axis to a position beyond the center transverse bar 35 of the concave frame 31. This is best shown in FIG. 10 but also can be seen in respect of the upper concave insert 39 in FIG. 9, bearing in mind that the inserts are identical.

The projecting portion 444 having a plurality of fastener holes 445 therethrough at spaced positions across the projecting portion.

Figures 5, 6:
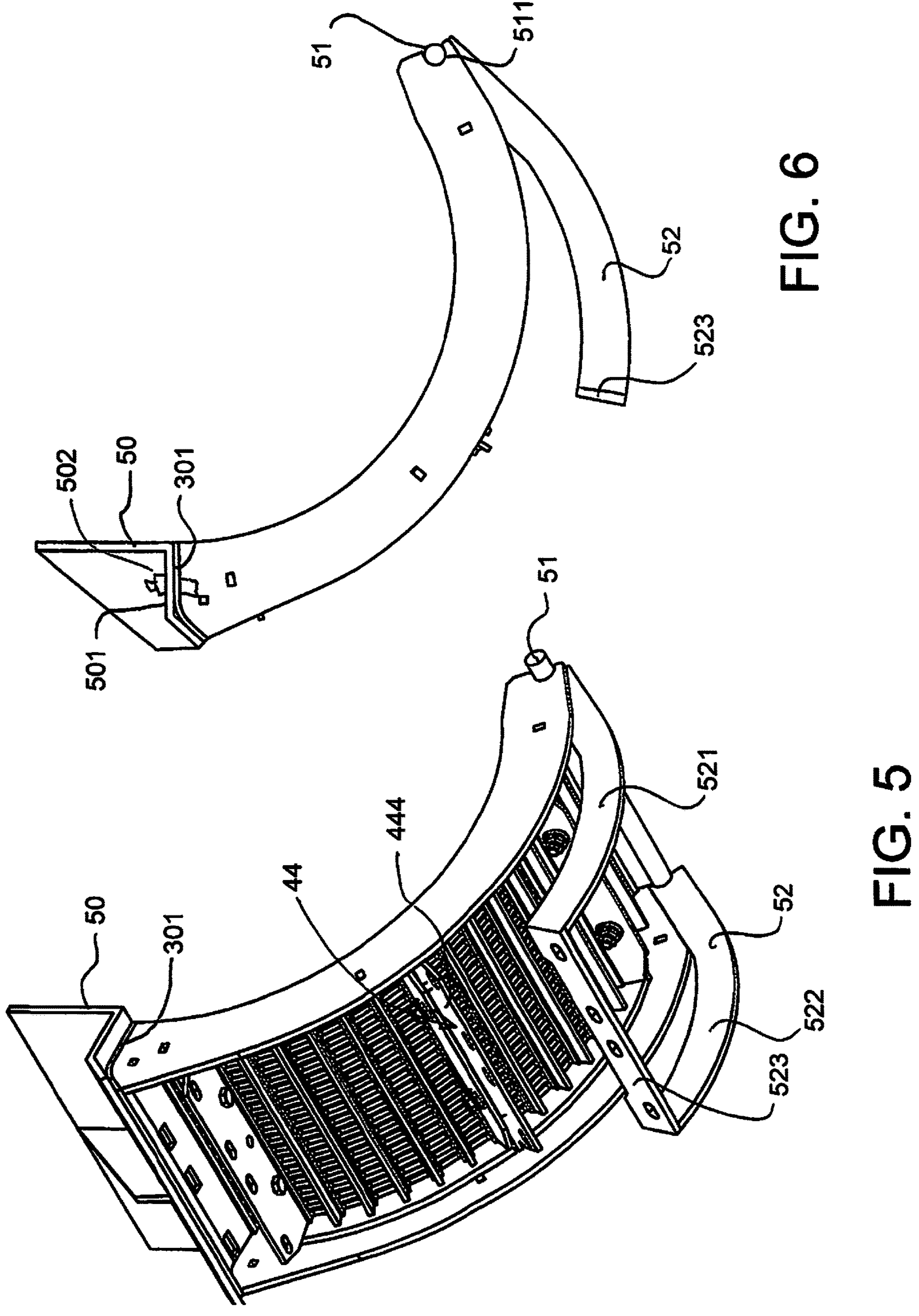
FIG. 5 is an isometric view of the outside face and one side of the concave apparatus according to the invention including components of the combine harvester with which it cooperates where the arrangement is shown in the release position in which the concave inserts can be removed from the frame.
FIG. 6 is a cross-sectional view of the concave apparatus according to the invention including components of the combine harvester with which it cooperates showing the arrangement in the release position.

Turning now to FIGS. 5 and 6, the mounting arrangement by which the concave is mounted in the combine harvester is shown. Thus the combine harvester includes an upper support beam 50 for receiving an upper end of a respective concave element and a lower support 51 for receiving a lower end of the respective concave element.

The beam 50 includes a V-shaped receptacle in its underside for receiving a top surface of a top plate 301 which fits into the receptacle and is fastened thereto by fasteners 502. The beam 50 is a permanent mounting point on the combine harvester and is located at a suitable position along the rotor to carry the required number of side by side concave elements.

The lower support 51 comprises a rod extending along the rotor at an angularly spaced position relative to the beam 50 to define the space for the concave elements. The rod also is fixed permanently in position as part of the combine harvester. The lower end of the side rails 32 and 33 of the concave frame 31 has a part cylindrical receptacle 511 which engages around and receives the rod to hold the frame in place at the lower end. The side rails 32 and 33 are braced at the lower end by a cross bar 512.

Figures 7, 8:
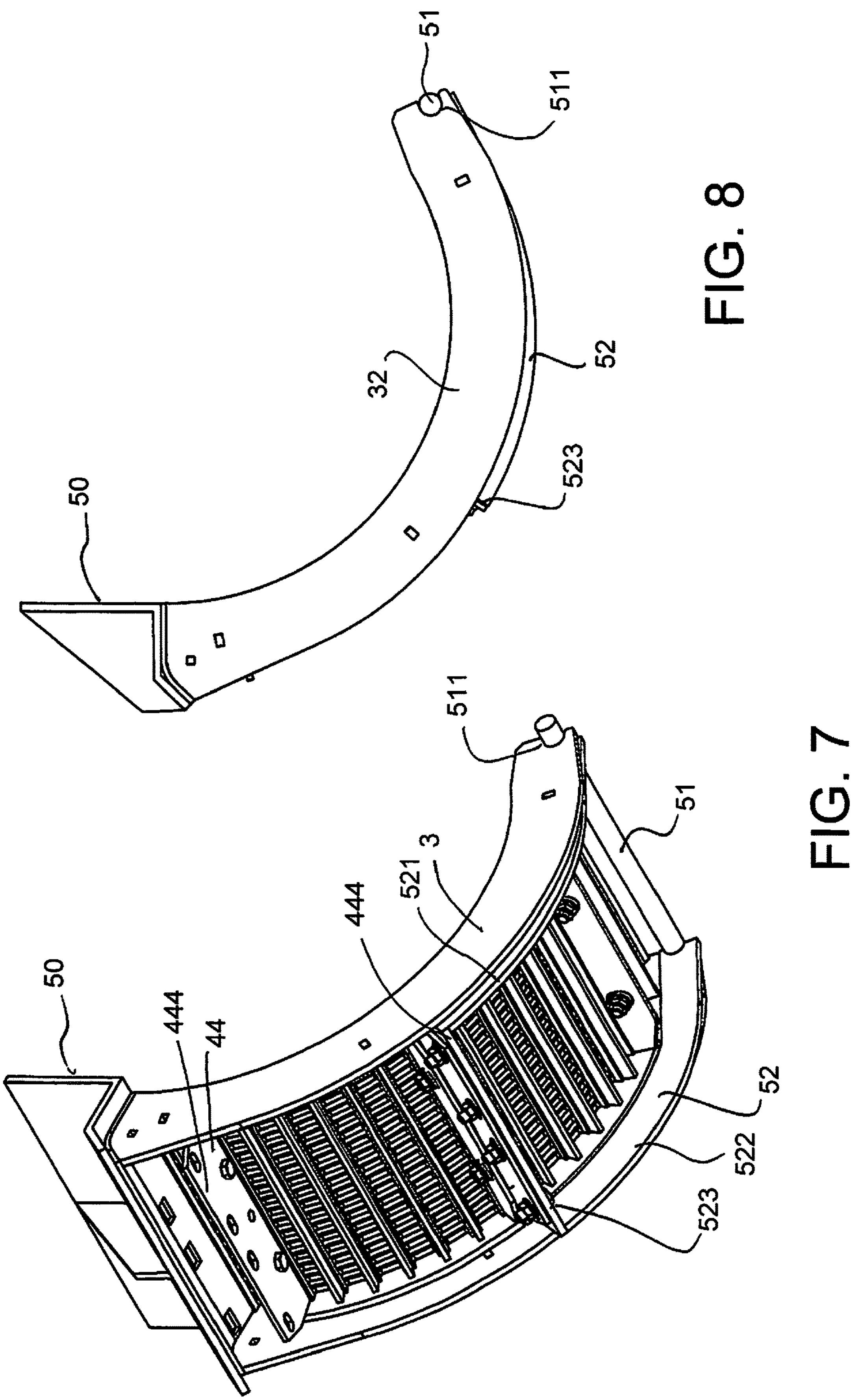
FIG. 7 is an isometric view of the outside face and one side of the concave apparatus according to the invention including components of the combine harvester with which it cooperates where the arrangement is shown in the locked position in which the concave inserts are fixed in the frame for operation.
FIG. 8 is a cross-sectional view of the concave apparatus according to the invention including components of the combine harvester with which it cooperates where the arrangement is shown in the locked position in which the concave inserts are fixed in the frame for operation.

The arrangement of the combine harvester concerned also includes for each respective concave element a bracket 52 pivotally mounted at the lower support rod 51 about an axis along the rod and thus parallel to the rotor axis. The bracket 52 includes two side rails 521 and 522 with an inner end pivotally mounted on the rod and an outer end carrying a connecting bar 523 extending across between the two side rails. The bracket 52 is movable between a first position, at the concave element as shown in FIGS. 7 and 8 where the bracket acts to hold the concave in place, and a second release position, shown in FIGS. 5, 6 and 10 where the bracket and particularly the bar 523 is spaced from the concave element.

The second release position of the bracket is thus arranged such that the connecting bar 523 is spaced from the concave element to allow release of the lower concave insert 40 from the concave support frame 31 while the concave support frame 31 remains in place attached to the upper support beam 50 and the lower support rod 51.

As best sown in FIG. 10, when in the first position, the bar 523 is moved to a position along arrow 524 so that the bar is aligned with and parallel to the projecting portion 444. In this position the bar 523 is bolted to the projecting portion through holes 445 using fasteners 525.

As the projecting portion 444 extends radially outwardly beyond the center plate 35, the bar 523 is bolted only to the projecting portion of the insert and not to the frame. This allows the bracket to be moved to the release position and the replaceable insert removed for replacement while the frame remains in place.

Each of the concave inserts includes the side rails 42 each of which lies immediately adjacent a respective side rail 32, 33 of the concave support. The side rails 42 of the concave insert are narrower in a radial direction than the concave support rails 32, 33 and the transverse bars 34, 35 and 36 of the concave support frame have a depth substantially equal to the side rails 42 of the concave insert. In this way the projecting portion 444 extends beyond the side rails 42 of the concave insert.

The concave support frame as best shown in FIG. 9 includes a concave portion 307 between the upper bar 34 and the upper support beam 301 which has rub bars 309 for cooperation with the rotor. Also a concave portion 308 Is provided between the lower bar 36 and the brace cross bar 512 which has rub bars 309.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A concave apparatus for use in a combine harvester where the combine harvester includes:

first and second side by side threshing and separating rotors;

each rotor having associated therewith mounting arrangements for mounting a series of arcuate side by side concave elements, where each concave element extends angularly around a portion of the cylinder and where the side by side concave element are arranged at positions along the axis of the rotor;

the mounting arrangement including an upper support for receiving an upper end of a respective concave element and a lower support for receiving a lower end of the respective concave element;

the concave apparatus comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

at least one of the lower transverse bar of the upper concave insert and the upper transverse bar of the lower concave insert having a projecting portion lying in an axial plane of the axis and projecting in a direction radially outwardly from the axis to a position beyond the center transverse bar of the concave frame;

the projecting portion having a plurality of fastener holes therethrough.

2. The concave apparatus according to claim 1 wherein the upper transverse bar of the lower concave insert has the projecting portion thereon.

3. The concave apparatus according to claim 1 wherein upper and lower concave inserts are symmetrical for use in either the upper space or the lower space.

4. The concave apparatus according to claim 1 wherein each of the concave inserts includes side rails each of which lies immediately adjacent a respective side rail of the concave support rail.

5. The concave apparatus according to claim 4 wherein the side rails of the concave insert are narrower than the concave support rails.

6. The concave apparatus according to claim 4 wherein the transverse bars of the concave support frame have a depth substantially equal to the side rails of the concave insert.

7. The concave apparatus according to claim 4 wherein the projecting portion extends beyond the side rails of the concave insert.

8. The concave apparatus according to claim 1 wherein the transverse connecting bars of the concave support frame including a top bar above the upper bar for attachment to the upper support of the mounting arrangement and wherein the concave support frame includes a lower engagement portion for engaging the lower support of the mounting arrangement.

9. The concave apparatus according to claim 8 wherein the lower support of the mounting arrangement comprises a cylindrical rod extending parallel to the axis and the lower engagement portion comprises on each side rail a respective cup shaped receptacle for receiving the rod.

10. The concave apparatus according to claim 1 wherein the upper support of the mounting arrangement comprises a V-shaped channel extending parallel to the axis and wherein the top bar of the concave support frame is arch shaped to engage into the V-shaped channel.

11. The concave apparatus according to claim 1 wherein the concave support frame includes a concave portion between the upper bar and the upper support which has rub bars for cooperation with the rotor.

12. The concave apparatus according to claim 1 wherein the concave support frame includes a concave portion between the lower bar and the lower support which has rub bars for cooperation with the rotor.

13. A combine harvester comprising:

first and second side by side threshing and separating cylindrical rotors each rotatable about a respective axis of the rotor;

a concave apparatus comprising a series of arcuate side by side concave elements each rotor having associated therewith mounting arrangements for mounting the side by side concave elements;

where each concave element extends angularly around a portion of the cylindrical rotor;

where the side by side concave element are arranged at positions along the axis of the rotor;

the mounting arrangement including an upper support for receiving an upper end of a respective concave element and a lower support for receiving a lower end of the respective concave element;

the mounting arrangement including for each respective concave element a bracket pivotally mounted at the lower support about an axis parallel to the axis and having a bracket connecting bar movable between a first position at the concave element and a second release position spaced from the concave element;

each concave element comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

at least one of the lower transverse bar of the upper concave insert and the upper transverse bar of the lower concave insert having a projecting portion lying in an axial plane of the axis and projecting in a direction radially outwardly from the axis to a position beyond the center transverse bar of the concave frame;

the projecting portion having a plurality of fastener holes therethrough for fastening to the bracket connecting bar when in the first position at the concave element;

the second release position of the bracket being arranged such that the bracket connecting bar is spaced from the concave element to allow release of the concave insert from the concave support frame while the concave support frame remains in place attached to the upper and lower supports.

14. The combine harvester according to claim 13 wherein the bracket includes two side rails connected to and supporting the bracket connecting bar where the side rails of the bracket lie immediately adjacent the side rails of the concave support frame.

15. The combine harvester according to claim 14 wherein the lower support of the mounting arrangement comprises a cylindrical rod extending parallel to the axis and the side rails of the bracket pivot around the cylindrical rod.

16. The combine harvester according to claim 13 wherein the upper transverse bar of the lower concave insert has the projecting portion thereon.

17. The combine harvester according to claim 13 wherein upper and lower concave inserts are symmetrical for use in either the upper space or the lower space.

18. The combine harvester according to claim 13 wherein each of the concave inserts includes side rails each of which lies immediately adjacent a respective side rail of the concave support rail; wherein the transverse bars of the concave support frame have a depth substantially equal to the side rails of the concave insert and wherein the projecting portion extends beyond the side rails of the concave insert.

19. The combine harvester according to claim 13 wherein the transverse connecting bars of the concave support frame including a top bar above the upper bar for attachment to the upper support of the mounting arrangement wherein the upper support of the mounting arrangement comprises a V-shaped channel extending parallel to the axis and wherein the top bar of the concave support frame is arch shaped to engage into the V-shaped channel.

20. A combine harvester comprising:

first and second side by side threshing and separating cylindrical rotors each rotatable about a respective axis of the rotor;

a concave apparatus comprising a series of arcuate side by side concave elements each rotor having associated therewith mounting arrangements for mounting the side by side concave elements;

where each concave element extends angularly around a portion of the cylindrical rotor;

where the side by side concave element are arranged at positions along the axis of the rotor;

the mounting arrangement including an upper support for receiving an upper end of a respective concave element and a lower support for receiving a lower end of the respective concave element;

the mounting arrangement including for each respective concave element a bracket pivotally mounted at the lower support about an axis parallel to the axis and having a bracket connecting bar movable between a first position at the concave element and a second release position spaced from the concave element;

each concave element comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

the bracket connecting bar being connected to the respective concave element when in the first position at the concave element;

the bracket connecting bar being releasable from the respective concave element to move to the second release position of the bracket such that the bracket connecting bar is spaced from the concave element to allow release of the concave insert from the concave support frame while the concave support frame remains in place attached to the upper and lower supports.

21. The concave apparatus according to claim 1 wherein the fastener holes of the lower transverse bar are arranged as a sliding fit over a collar of the coupling fastener so that each of the upper and lower concave inserts is simply a sliding fit over the collar at the lower end and is screw fastened at the upper end so that the upper and lower concave inserts are held in place by screw connectors only at the upper end and are loosely coupled at the lower end so that when the upper screw connectors are removed the concave insert can simply be pulled out from its place.

22. The combine harvester according to claim 13 wherein the fastener holes of the lower transverse bar are arranged as a sliding fit over a collar of the coupling fastener so that each of the upper and lower concave inserts is simply a sliding fit over the collar at the lower end and is screw fastened at the upper end so that the upper and lower concave inserts are held in place by screw connectors only at the upper end and are loosely coupled at the lower end so that when the upper screw connectors are removed the concave insert can simply be pulled out from its place.

23. A combine harvester comprising:

first and second side by side threshing and separating cylindrical rotors each rotatable about a respective axis of the rotor;

a concave apparatus comprising a series of arcuate side by side concave elements each rotor having associated therewith mounting arrangements for mounting the side by side concave elements;

where each concave element extends angularly around a portion of the cylindrical rotor;

where the side by side concave element are arranged at positions along the axis of the rotor;

the mounting arrangement including an upper support for receiving an upper end of a respective concave element and a lower support for receiving a lower end of the respective concave element;

each concave element comprising:

a concave support frame including two side rails arranged to lie in respective radial planes of the axis and extend around the portion of the cylinder and a plurality of transverse connecting bars at right angles to the side rails;

a pair of concave inserts each for insertion into and mounting on the concave support frame;

each concave insert having a rectangular arcuate body with a plurality of rub bars facing the rotor for cooperation therewith;

the transverse connecting bars of the concave support frame including an upper bar, a center bar and a lower bar defining an upper rectangular space for an upper one of the pair of concave inserts and a lower rectangular space for a lower one of the pair of concave inserts;

the upper concave insert having a lower transverse bar at a lower end and an upper transverse bar at an upper end;

with the upper transverse bar of the upper concave insert having fastener holes to receive coupling fasteners for connection to the upper transverse bar of the concave support frame;

with the lower transverse bar of the upper concave insert having fastener holes to receive coupling fasteners for connection to the center transverse bar of the concave support frame;

the lower concave insert having a lower transverse bar at a lower end and an upper transverse bar at an upper end;

with the upper transverse bar of the lower concave insert having fastener holes to receive coupling fasteners for connection to the center transverse bar of the concave support frame;

with the lower transverse bar of the lower concave insert having fastener holes to receive coupling fasteners for connection to the lower transverse bar of the concave support frame;

wherein the fastener holes of the lower transverse bar are arranged as a sliding fit over a collar of the coupling fastener so that each of the upper and lower concave inserts is simply a sliding fit over the collar at the lower end and is screw fastened at the upper end so that the upper and lower concave inserts are held in place by screw connectors only at the upper end and are loosely coupled at the lower end so that when the upper screw connectors are removed the concave insert can simply be pulled out from its place.

* * * * *